Figure 3:
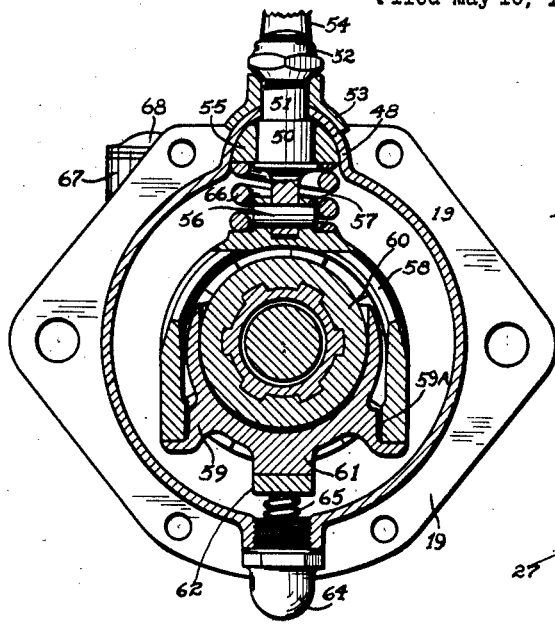
Figure 4:
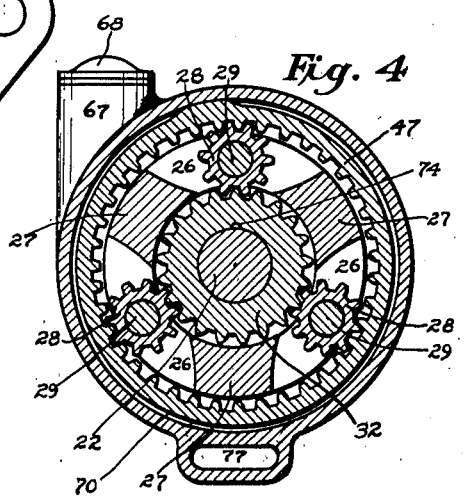
Figure 1:
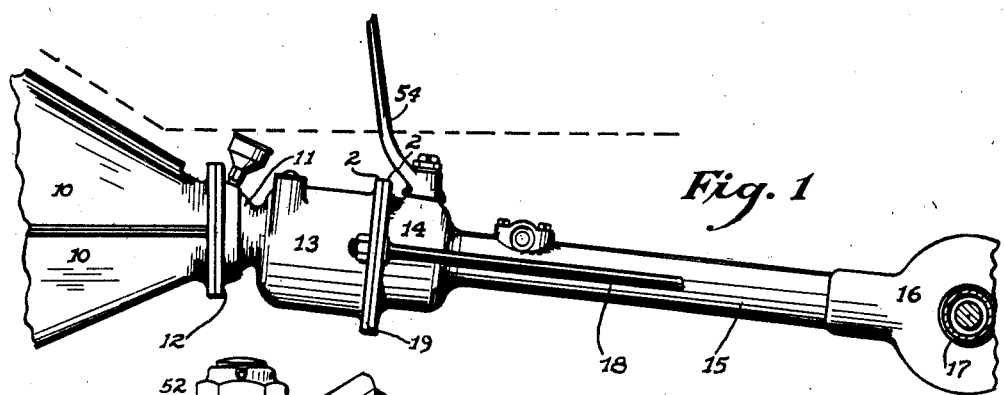
Figure 5:
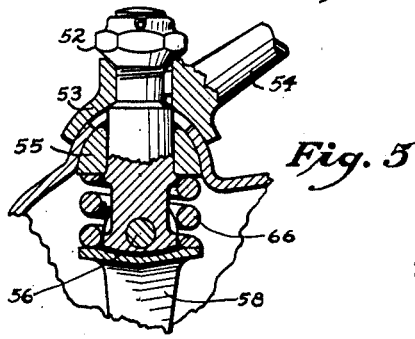

June 19, 1928.

H. FORD 1,674,006

AUXILIARY TRANSMISSION

Filed May 10, 1926

2 Sheets-Sheet 1

Inventor
Henry Ford.
By E. L. Davis.
Attorney

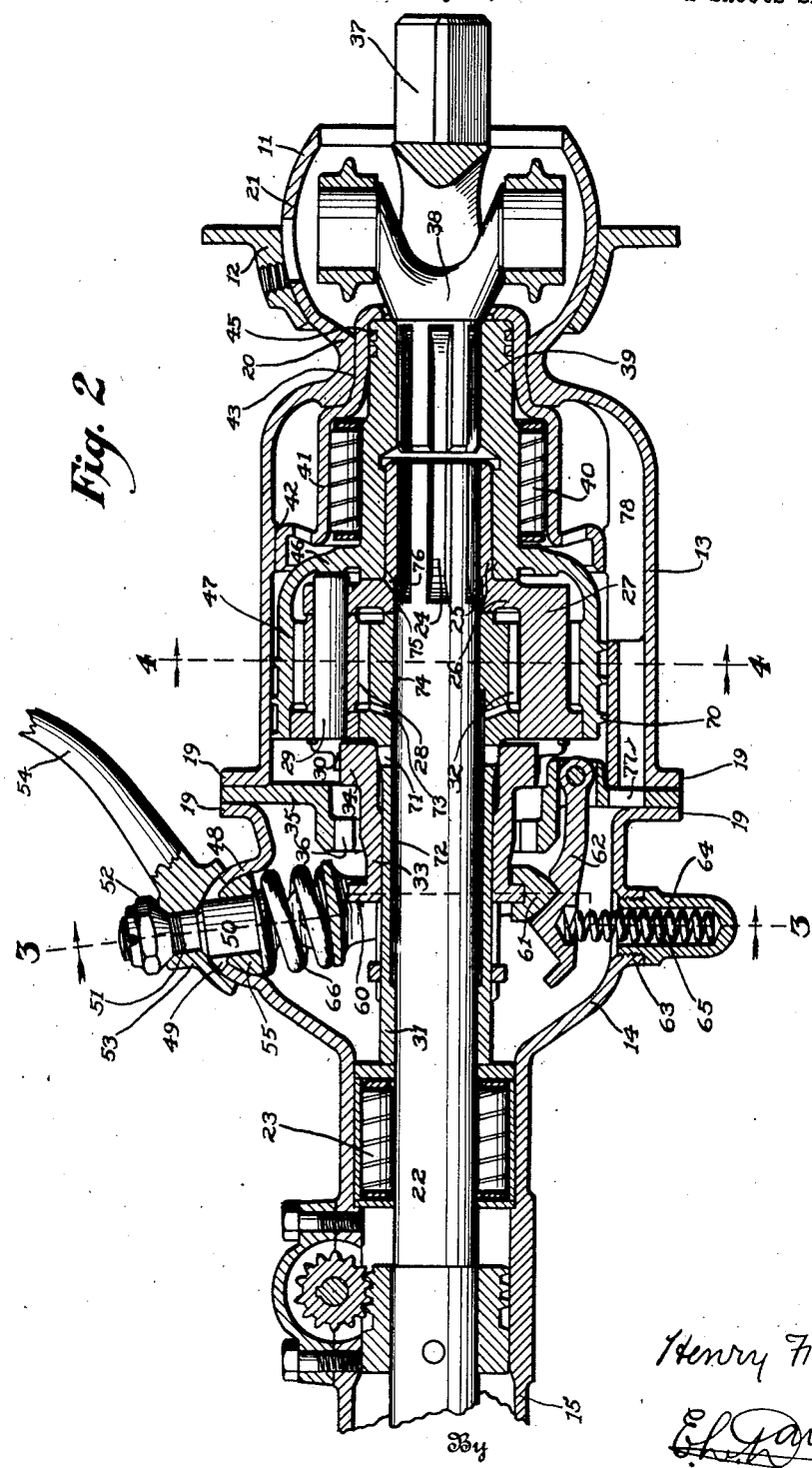

Patented June 19, 1928.

1,674,006

UNITED STATES PATENT OFFICE.

HENRY FORD, OF DEARBORN, MICHIGAN.

AUXILIARY TRANSMISSION.

Application filed May 10, 1926. Serial No. 107,975.

The object of my invention is to provide improvements in an auxiliary transmission of simple, durable and inexpensive construction.

A further object of my invention is to provide an auxiliary transmission which may be constructed as part of the drive shaft housing for an automobile whereby it will be possible to secure two driving speeds in combination with those ordinarily supplied in connection with the transmission usually provided for an automobile or truck, whereby four forward and two reverse speeds are possible in a vehicle ordinarily having only two forward and one reverse speed. It will no doubt be understood in this connection that with an ordinary automobile or truck there is a transmission provided which gives usually two to four forward speed ratios and one reverse ratio. Under certain circumstances such as in climbing hills or in transporting heavy loads, it is desirable to reduce the speed of the vehicle and consequently increase the pulling power of the engine thereof, but the transmissions ordinarily provided have such a relatively high reduction on their second or low speed that the engine would become overheated if the vehicle were run in second or low speed for any great distance, so that it is the object of my invention to provide what may be termed an intermediate high gear drive which may be utilized when it is desired to increase the pulling power of the engine or at the same time decrease the speed thereof.

Still a further object of my invention is to provide an auxiliary transmission which shall be efficient, compact, economical and readily installed in the vehicle.

Still a further object of my invention is to provide an auxiliary transmission of the planetary type of gear reduction whereby, I may secure a direct drive through the drive shaft when traveling in direct high speed and may secure a reduction when traveling in the intermediate high speed.

Still a further object of my invention is to provide in combination with such a planetary reduction gear, a shifter lever which will enable the operator to utilize either direct or intermediate high speed at will.

Still a further object of my invention is to provide a planetary type of reduction gearing for an auxiliary transmission wherein the means for operating the shifting mechanism is so constructed that it is substantially impossible for the reduction mechanism to be in a neutral position, that is, to provide in combination with the auxiliary transmission, a shifter lever which is so constructed that it is practically impossible to put it in such a place that the parts will stay in neutral position to thereby disconnect the usual transmission from the drive shaft of the vehicle.

Still a further object of my invention is to provide an auxiliary transmission of the planetary reduction gear type wherein the entire assembly of the planetary drive may be clutched together in one position of the shifter lever to cause the entire assembly to rotate as a unit thereby transmitting a direct drive from the universal of the vehicle to the drive shaft and which in another position may have the center gear clutched to the housing so that the outer ring or shell of the planetary may receive the driving impulse from the universal, planetary spider may receive its driving impulse through the planetary gears rolling on the stationary center gear, thereby accomplishing the desired speed reduction.

Still a further object of my invention is to provide a shifter lever which is constructed in two separate parts which are connected together by a resilient device, whereby the operation of the handle part of the shifter lever will cause the actuating portion of the lever to always be in one of two pre-determined positions whereby the transmission will operate either in the direct or intermediate high speed connection to thereby insure that the parts will never stand in neutral position.

With these and other objects in view, my invention consists in the arrangement, combination and construction of the various parts of my improved device as described in the specifications, claimed in my claims, and shown in the accompanying drawings, in which:

Figure (1) shows a somewhat diagrammatical view of a transmission, my improved auxiliary transmission, a drive shaft and a portion of a rear axle housing.

Figure (2) shows a vertical central longitudinal sectional view through the auxiliary transmission illustrated in Figure (1).

Figure (3) shows a vertical sectional transverse view taken on the line 3—3 of Figure (2).

Figure (4) shows a vertical transverse sectional view taken on the line 4—4 of Figure (2), and Figure (5) shows an enlarged detail sectional view illustrating the connection between the two main members of the shifter lever.

Referring to the accompanying drawings, I have used the reference numeral 10 to indicate generally the housing of a transmission such as is ordinarily provided in connection with the ordinary automotive vehicle such, for instance, as a pleasure car or truck.

Rearwardly of the transmission proper is the universal joint drive housing (11), which is secured by flanges (12) to the rear end of the transmission. The auxiliary transmission which comprises my invention is disposed rearwardly of the universal joint and the drive shaft housing (15) is disposed rearwardly of my improved auxiliary transmission. The differential housing (16) adjoins the rear end of the drive shaft housing (15), and has axle housings (17) extended in either direction therefrom. These parts are shown somewhat diagrammatically in Figure (1), in order to illustrate the disposition and operation of my improved auxiliary transmission, as the various parts described, with the single exception of the auxiliary transmission, form no part of my invention except insofar as they cooperate therewith to form the completed vehicle.

The housing for my improved auxiliary transmission is made of two main parts, the forward portion (13) thereof, being of substantially circular cross-section and having a contracted portion at the forward end thereof, and forward of this contracted portion (20), is a bowl shaped shell (21), designed to form a portion of the universal drive (11). Mounted on this shell (21) for universal movement is the flange (12) which is bolted to the rear end of the transmission housing so that there may be universal movement between the forward member of my improved auxiliary transmission housing and the rear end of the ordinary transmission member of the vehicle. The rear portion of the housing for my improved transmission is formed by making an enlargement or bell (14), on the forward end of the drive shaft housing (15), the section (14) and the section (13) being united together by bolting the securing flanges (19) on the adjacent ends thereof together. The drive shaft (22), within the drive shaft housing (15), extends forwardly into the housing for my improved auxiliary transmission and is journalled in a roller bearing (23), adjacent to the forward end of the drive shaft housing proper (15), and near the rear end of the bell (14). The forward end of the shaft (22) has splines (24) thereon, designed to co-operate with corresponding splines on the inner surface of a sleeve (25) which is provided with an annular flange (26) at the rear end thereof, which in turn forms the support for an annular ring (27), which has spaced recesses therein, designed to receive planetary gears (28). These planetary gears (28) are rotatably mounted on pins (29) which are driven into the ring (27) through the recesses. The rear edge of this ring (27) has clutch teeth (30) formed thereon for a purpose which will hereinafter be described.

Loosely mounted on the shaft between the sleeve (25) and the bearing (23), is a second sleeve (31) which has teeth formed at (32) thereon designed to engage the teeth of the planetary gears (28), thus forming the inner gear of the planetary gear train. Intermediate of the ends of this sleeve (31) are formed splines which permit a clutch member (33) to be mounted on the sleeve for longitudinal movement but not for rotation. Adjacent to the forward end of this clutch member, teeth (34) are formed so that when the clutch member is in one position, these teeth (34) may coact with the sleeve (30) at the rear end of the ring (27).

A disk (35) is disposed between the members of the auxiliary transmission housing and secured in place by the means which secures the flanges (19) together, and the disk (35) is provided with internal teeth (36) which are designed to coact with the teeth (34) of the clutch (33) when the clutch (33) is in its rearmost position.

A universal joint member of ordinary construction and comprising forks (37) and (38) is disposed in the housing formed by the shell (11) and the rear end of the main transmission (10). The forward fork member (37) has a squared end designed to be connected in any suitable way with the drive shaft of the transmission and the rear fork member (38) has a splined end designed to be received in a correspondingly formed sleeve (39) which is rotatably supported in ball bearing (40), this bearing being mounted in a cup (41) having a press fit at (42) and (43) in the housing (13).

The rear of the sleeve (39) is drilled to form a bearing for the forward end of the sleeve (25) which is splined on the forward end of shaft (22) whereby the forward end of shaft (22) is journalled in the housing (13) through bearing (40) and the sleeve (39). Oil retaining rings (45) are preferably provided adjacent to the forward end of the sleeve (39) in contact with the cup (41) to prevent oil from the transmission running into the universal housing (11) from my improved auxiliary transmission or vice versa. The rear end of the sleeve (39) has an outwardly extended integral flange (46) which terminates in the cylindrical shell (47) which has internal teeth therein whereby the shell (47) may form the outer or ring gear of the planetary reduction gear used in connection with my improved auxiliary transmission.

From the construction of the parts heretofore described, it will be seen that rotation of the universal joint comprising the members (37) and (38) will be applied to the sleeve (39) and thereby to the planetary shell (47) whenever the main transmission of the vehicle is operated. If clutch member (33) is in the position shown in Figure (2), it will be seen that the teeth (34) on the clutch member will be meshed with the teeth (30) on the planetary spider whereby the planetary spider will be held from rotation relative to the sleeve 31 which forms the inner gear of the planetary train. This means that the planetary gears 28 cannot rotate relative to each other or the sleeve (31) and will be held non-rotatable upon the pins (29). This means, therefore, that rotation of the shell (47), due to the engagement of the internal teeth therein with the outer teeth on the planetary gears (28), will cause these gears, and consequently the planetary spider (27) to be carried around at the same rate of speed as the universal joint is rotated. As the planetary spider (27) is connected by the sleeve (25) to the drive shaft (22) that means that rotation of the universal joint will apply rotation to the drive shaft (22) at the same speed.

If, however, the clutch member (33) be moved to position where the teeth (34) thereon engage the teeth (36), it will be seen that this will hold the sleeve (31) from rotation due to the spline connection between the clutch member (33) and the sleeve (31). The teeth (32) of the inner gear of the planetary train will, therefore, be held stationary, so that when the universal joint rotates the planetary shell (47), it will be seen that engagement of planetary gears (28) with the stationary teeth of the sleeve (31) and moving teeth of shell (47), will cause these planetary gears to roll around the stationary teeth (32) thereby carrying around the planetary spider (27), which being attached to the drive shaft (22), causes the latter to rotate. This rotation, due to the reduction effect of the planetary gearing in the form of transmission here shown, causes a reduction of .65 to 1.00 in the speed of rotation of the drive shaft (22) as compared with the speed of the universal joint.

The following mechanism is provided for operating clutch member (33). A boss (48) of spherical or circular cross section is provided on the bell (14) of the auxiliary transmission housing, adjacent to the rear central portion thereof. This boss or shell (48) has an elongated slot (49) therein designed to receive the pin (50). The outer end of this pin (50) is contracted at (51), and threaded so that a nut (52) may be screwed down on the sleeve (53) which forms the lower end of the shift control lever (54). The lower edge of sleeve (53) is also of circular cross section corresponding to the curvature of shell (48) there being between sleeve (53) and shell (48) a ring (55) around the pin (50) just inside of the shell (48) which has its exterior surface of circular cross section to correspond with the interior surface of the shell (48). The lower end of the pin (50) is contracted and has an opening therethrough designed to receive a pivot pin (56) upon which is pivotally mounted a pair of ears (57) which extend from the upper edge of a clutch fork (58). This fork (58) engages pockets (59ª) in a forked member (59) which in turn engages a flange (60) on the clutch member (33) which permits the clutch member (33) to rotate, but insures its longitudinal reciprocation upon the operation of the shifter lever (54).

The lower end of this fork (59) has a tooth (61) formed therein and a spring detent (62) is pivotally mounted on disc (35) with a pair of notches therein designed to engage the tooth (61) in such a way that the tooth (61), due to the spring pressure on the detent (62) must remain in one of the two notches in the detent (62). A nipple (63) extends from the bell (14) below the shell (48) and has its inside threaded to receive a cup (64), which causes a spring (65) to urge the detent (62) upwardly. A spring (66) is inserted between the ring (55) and the fork (58) around the pivot (56).

The pressure of the spring (65) and the slant of the notches in the detent (62) is proportioned so that the pressure of the spring (66) which tends to hold the axes of the pin (50) and the fork (58) in alignment, will cause the tooth (61) to ride over the ridge between the notches and consequently the clutch (33) will always be thrown into engagement with the teeth (30) or the teeth (36) whatever the position of the shift lever (54) may be.

It will be seen that this feature of making a shifter lever of a somewhat flexible construction which thereby prevents the clutch from ever being in neutral position, is quite a valuable feature on my invention as there are certain vehicles which have the service brake in the transmission of the vehicle whereby a service brake on the transmission may be rendered inoperative if the clutch member (33) were ever allowed to remain in a neutral position as the drive shaft (22) would be disconnected from the transmission when the clutch (33) is in such neutral position.

The sleeve (53) and the ring (55) with their circular surfaces form with the shell (48) an oil tight joint so that no oil may leak out from the housing at the point of connection of the gear shift lever (54).

I have provided the following means for lubricating my improved auxiliary transmission. It will be noted that when the clutch (33) is in its forward position, then that the planetary gear train will not be in operation so that the oiling thereof need not be excessive. When, however, the clutch (33) is in its rearward position so that the teeth (34) are in mesh with the teeth (36), the planetary gear train will be in operation and sufficient lubrication thereof will be necessary.

As has heretofore been described, the housing (13) is substantially of circular cross section and is designed to be partially filled with oil or other suitable lubricant. The planetary gear train (47) is of slightly less diameter than the interior of the housing (13) and is provided with a spiral rib (70) which extends to position adjacent to the inner surface of the housing (13). This rib picks up the oil from the bottom of the housing and forces its rearwards, when the shell is rotated, into the pocket formed at the rear of the planetary transmission and at the front of the disc (35). When the planetary gear is in operation, it will be seen that the circular opening through the disc (35) will be substantially closed by the clutch (33) and the teeth (34) thereon, so that the oil forced into this pocket, just described, will be forced through openings (71) in the sleeve (31) into the space (72) between the interior of the sleeve (31) and the exterior of the shaft (22). The oil will travel along this opening (72) and will be thrown out through openings (73) in the sleeve (31) into the recesses in which the planetary gears (28) are received, thereby lubricating the teeth and bearings of the planetary gear train. The sleeve (31) at the forward end thereof has a groove (74), formed therein which permits the oil from the pocket (72) to travel forward to annular groove in the rear end of sleeve (25). A plurality of holes (76) are drilled from this annular recess (75) to the exterior of the sleeve (25) thereby oiling the bearing surface between the sleeve (39) and said sleeve (25). It will thus be seen that during the operation of the planetary reducing gear train, the various parts thereof will be efficiently lubricated. When the parts are in the position shown in Figure (2) and the planetary reducing gear train is not in operation, the spiral rib (70) will force the oil in the bottom of the housing (13) rearwards through the opening in the disc (35) and thence the oil will be returned to the housing (13) through an opening (77) at the bottom of the disc (35) which communicates with a groove (78) in the bottom of the housing (13).

A suitable hollow boss (67) having a cover (68) thereon is provided for the purpose of supplying lubricant to my improved auxiliary transmission.

In the practical operation of my improved auxiliary transmission, it will be seen that in order to get a direct drive from the universal drive shaft the parts will be placed as shown in Figure 2. However, if it is desired to use the planetary reduction gear provided by my transmission, the shifter lever (54) is shifted forwardly whereby the clutch number 33 is shifted rearwardly and teeth 34 mesh with teeth 36 thereby operating a planetary reduction gear to at a speed ratio of .65 to 1.00 as between the drive shaft and the universal joint speed.

Among the many advantages arising from the use of my improved device, it will be seen that I am enabled to efficiently haul heavy loads, and drive a vehicle in heavy traffic or in hilly country with the auxiliary transmission having the planetary reduction gear in operation. When, however, the parts are placed in a position to give a direct drive from the universal to the drive shaft, it will be seen that I am enabled to secure the ordinary advantages of having a relatively high speed vehicle with the consequent economy of fuel and speed of operation. With this improved transmission which I have provided, it is normally impossible to allow the universal to become disconnected from the drive shaft due to this auxiliary reduction gear whereby the transmission brake of the vehicle might become useless or unserviceable. Moreover, I have combined the housing of the drive shaft and the universal joint so that the extensions thereon form the housing for my improved auxiliary transmission whereby I am enabled to economize on material and render the device more efficient.

Some changes may be made in the arrangement and construction of the various parts of my improved device without departing from the spirit of my invention and it is my intention to cover by the following claims such changes as may be reasonably included within the scope thereof.

I claim as my invention:

1. In a vehicle having a universal joint and a drive shaft, a universal joint housing having an enlarged rear end formed integrally therewith, a drive shaft housing having an enlarged forward end formed integrally therewith, means for securing said enlarged ends together whereby said enlarged ends may form an auxiliary transmission housing, and an auxiliary transmission device housed in the housing so formed.

2. In a vehicle having a universal joint and a driveshaft, a universal joint housing having an enlarged rear end, a driveshaft housing having an enlarged forward end, securing flanges on said ends a disc disposed between said enlarged ends having locking teeth formed thereon and adapted to be secured in place by the means which secures said flanges together, an auxiliary transmission housed in the housing formed by said enlarged ends, said transmission including a clutch member having locking teeth thereon, and means for shifting said clutch member into engagement with the locking teeth on said disc.

Signed at the city of Detroit, county of Wayne, State of Michigan, this 6th day of May, 1926.

HENRY FORD.